UNITED STATES PATENT OFFICE.

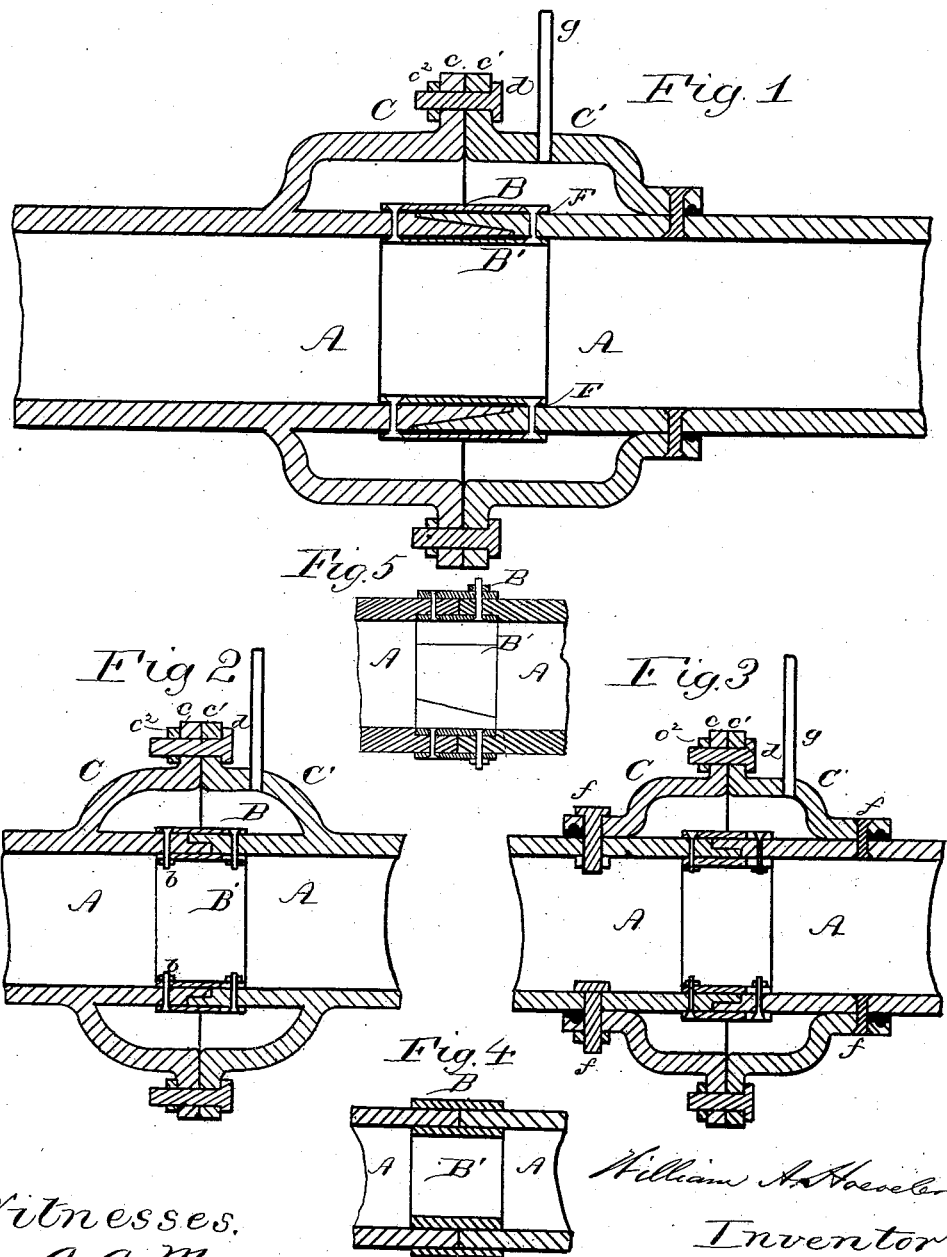

WILLIAM A. HOEVELER, OF PITTSBURG, PENNSYLVANIA.

PIPE-COUPLING.

SPECIFICATION forming part of Letters Patent No. 333,413, dated December 29, 1885.

Application filed November 3, 1885. Serial No. 181,767. (No model.)

*To all whom it may concern:*

Be it known that I, WILLIAM A. HOEVELER, a citizen of the United States, residing at Pittsburg, in the county of Allegheny and State of Pennsylvania, have invented certain new and useful Improvements in Pipe-Couplings; and I do hereby declare the following to be a full, clear, and exact description of the invention, reference being had to the accompanying drawings, which form part of this specification.

This invention has relation to pipe-couplings, and relates more particularly to couplings for pipes or conduits for conveying "natural gas" under considerable pressure, as it has been found in this class of devices that, owing to the fact that natural gas is of an exceedingly light and penetrating character, it is almost, if not entirely, impossible to construct a coupling or joint for the pipes in which it is conveyed which will not leak to a greater or less degree, and that it is necessary to surround the joint or coupling with a casing or box from which a pipe leads off, the gas escaping through the joint or coupling.

My invention has for its object the provision of a novel form of coupling for the meeting ends of sections of gas-pipe, and has for its further object the provision of a novel form of casing or box adapted to inclose the joint or coupling and receive any gas which may leak therethrough, an escape-pipe leading from said box or coupling conveying off such leakage-gas to any desired point.

With these objects in view my invention consists, essentially, in, first, forming the abutting ends of the pipes to be coupled with straight, overlapping, rabbeted, or beveled edges, and securing the same together by means of rings or bands located inside and outside the joint, so as to embrace the same, and fastened to the pipes by means of bolts and nuts or rivets passing through the walls of the pipe and through the bands, so as to practically close the joint and render the same comparatively gas-tight; secondly, in the combination, with the gas-conduit in which the sections are coupled and secured together, as above set forth, of a casing or box surrounding the joint and constituting a chamber for the reception of leakage-gas, said casing being formed and consisting of two bowls having flanged mouths, which are secured together by bolts and nuts, and which are attached to or made part of the section to which they pertain, the casings so formed being provided with suitable escape-pipes.

In the accompanying drawings, Figure 1 is a longitudinal sectional view of my improved coupling, and Figs. 2 and 3 sectional views of modifications.

A A designate two separate sections of pipe, which, for the purposes of my invention, are beveled, as shown in Fig. 1, rabbeted, as shown in Figs. 2 and 3, or made plain, as shown in Fig. 4.

B designates a ring or cylinder surrounding the joint, and B' designates a similar ring of smaller diameter located on the inside of the joint corresponding with the ring B. The rings B B' in the constructions shown in Fig. 2 are secured to the ends of the sections in a peculiar manner, necessitated by the fact that no access can be had to the interior of the casing after its parts are bolted together, the bowls of the casing being integral with the sections. In the constructions shown in Figs. 1 and 3 the rings are secured to the ends of both sections by bolts or rivets passing through both rings and rigidly fastened thereto; but the rings may, if desired, be secured to the sections by shrinking or expansion, as shown in Fig. 4, where the bolts or rivets are omitted. The rings or bands B B' may either be continuous, split, or in sections, and in some cases the bands may be let into recesses in the pipes, as shown in Fig. 5. In the construction shown in Fig. 2, however, where the bowls forming the casing are integral with the pipe, the rings B B' are first secured by bolts $b\ b$ to one of the sections, or one ring is secured to one section and the other to the adjacent section, while the rings are slotted on line corresponding with the bolts on the other section, so that when the two sections are brought together each ring will embrace or interlock with the projecting ends of the bolts on the other ring, as shown.

The casing, as has been suggested, consists of two bowls, C C', having flanges $c\ c'$ around their mouths, which are pierced for the passage of bolts $d\ d$, having nuts $c^2\ c^2$, by which the bowls are secured together, their lips being in contact, or a ring of lead or other appropriate packing material being interposed, as shown at *e*. These bowls may be made either a part of the pipe-sections, as shown in Fig. 2, or they may be made separate therefrom and secured to the sections by bolts or rivets *f f*, as shown in Fig. 3, or other equivalent devices. These casings constitute chambers for the reception of leakage-gas, should any escape through the inner joint, and are provided with connections *g g*, for the emission of said gas from the chamber. Where the rings or cylinders B B' are made of hard metal, packing-rings F F may be inserted between them and the surface of the pipe.

I do not claim, broadly, forming the bowls which constitute the casings integral with the body of the pipe; nor do I claim the casing so constructed and provided with an outlet or escape.

Having fully described my invention, I claim—

1. In a pipe-coupling, the combination, with the sections A A, having their adjacent ends correspondingly beveled, rabbeted, or tongued and grooved, of the bands or rings B B', embracing the joint and secured to the sections by bolts or rivets, substantially as described.

2. In gas-conduits, the combination, with the sections A A and the rings or bands B B', embracing the joint and secured to the sections, of the bowls C C', having flanged mouths and secured together by means of bolts and nuts passing through the flanges, substantially as described.

3. In a pipe-coupling for gas mains or conduits, the combination, with the sections A A, having beveled or rabbeted ends, of the hard-metal interior and exterior rings, B B', riveted or otherwise secured to the sections, and the interposed packing-rings F F, substantially as described.

In testimony that I claim the foregoing I have hereunto set my hand this 31st day of October, 1885.

WILLIAM A. HOEVELER.

Witnesses:
THOS. A. CONNOLLY,
C. L. STRAUB.